No. 659,324. Patented Oct. 9, 1900.
C. H. SAWYER.
DRAFT EQUALIZER.
(Application filed Feb. 26, 1900.)
(No Model.)
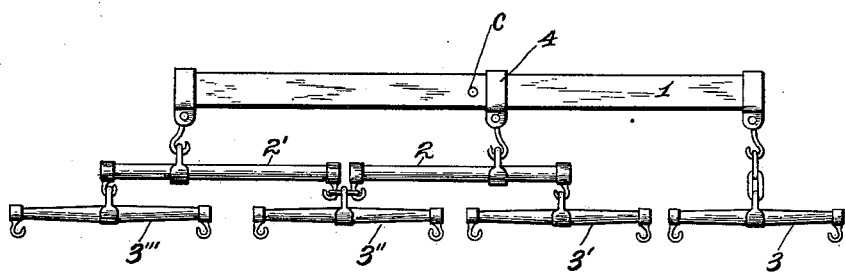
Witnesses:
G L Belfry
M. Byd
Inventor.
Charles H. Sawyer
By Emil Starek Atty.
THE NORRIS PETERS CO., PHOTO-LITHO., WASHINGTON, D. C.

UNITED STATES PATENT OFFICE.

CHARLES H. SAWYER, OF ST. LOUIS, MISSOURI.

DRAFT-EQUALIZER.

SPECIFICATION forming part of Letters Patent No. 659,324, dated October 9, 1900.

Application filed February 26, 1900. Serial No. 6,605. (No model.)

*To all whom it may concern:*

Be it known that I, CHARLES H. SAWYER, a citizen of the United States, residing at St. Louis, in the State of Missouri, have invented certain new and useful Improvements in Draft-Equalizers, of which the following is a full, clear, and exact description, reference being had to the accompanying drawing, forming a part hereof.

My invention has relation to improvements in draft-equalizers; and it consists in the novel construction and arrangement of parts more fully set forth in the specification and pointed out in the claims.

In the drawing the figure represents a general plan of the equalizer.

One object of my invention is to construct a draft-equalizer which will positively and effectively distribute the load equally among the several draft-animals attached to the device.

A further object is to minimize the breaking strain upon the member or base-bar immediately connected to the load to be drawn.

While the present equalizer is specially designed to be used in connection with plows and other agricultural implements, it is apparent that it could be used with other loads or vehicles to be drawn.

In detail the invention may be described as follows:

Referring to the drawing, 1 represents a base-bar having its point of attachment to the plow or other load (not shown) at the point C, said point being in the line of draft—that is, the line about which all the forces are equalized in the drawing of the implement in a direct line. Attached at one end of the base-bar by means of a clip and link or otherwise is a singletree 3, and at the opposite end is attached an "evener" or "distributer" bar 2', a similar intermediate evener or distributer 2 being hung from a point 4 along the base-bar, the adjacent ends of the distributers 2 2' being linked or coupled together, and from their coupled ends is hung a singletree 3'', the coupled arms of the distributers being the longer. The ends of the short arms of the distributers have hung therefrom the singletrees 3' and 3'''. As seen from the drawing, all the singletrees are equidistant from the base-bar, three of them being suspended from the distributers 2 2' and only one singletree, 3, being connected directly to the base-bar. The point of suspension or attachment of the singletree 3 is nearer the point C than is the opposite extreme singletree 3''', which, as clearly shown, has its point of attachment at the end of the short arm of the outer distributer-bar 2'. Accordingly in order to properly assist the animal hitched to singletree 3 it is necessary to make the point of attachment 4 of the intermediate distributer 2 on that side of the point C which is nearer to or toward the singletree 3. By the present arrangement also the animals hitched to singletrees 3' and 3'' pull at the base-bar 1 from the point 4, thereby minimizing the danger of the bar bending about its point of attachment C, and hence under my present arrangement the bar 1 may be made much lighter and of smaller cross-section than is the case in the majority of draft-equalizers. The distance between the center of draft C and the point of attachment of the outer singletree 3 with the base-bar is just sufficient to permit the animal coupled to said singletree to tread in the path of the furrow left by the plow during any previous plowing operation, and as it is desirable that the animal coupled to this singletree shall be removed this distance it is apparent that my present device presents advantages over any other form of draft-equalizers. This distance brings the outer horse on that side nearer the point of draft than in any other equalizer known to me. It is further apparent that my device is totally devoid of any side draft-levers or combination of levers or offsets, the draft being always at right angles to the general direction of the base-bar.

Having described my invention, what I claim is—

1. A draft-equalizer comprising a base-bar, a singletree coupled thereto at a certain distance from the point of draft thereof, a distributer coupled thereto at a certain distance on the opposite side of the point of draft, and an intermediate distributer coupled to the base-bar at a point on that side of the point of draft which is nearer the point of attachment of the singletree to the base-bar, substantially as set forth.

2. A draft-equalizer comprising a base-bar, a singletree coupled at one end thereof, a distributer-bar coupled to the opposite end, an intermediate distributer, the adjacent arms of the distributers being coupled together, a singletree suspended from the coupled ends, a singletree coupled to the free arm of each distributer, the several singletrees being equally removed from the base-bar, and the point of attachment of the intermediate distributer-bar being on that side, of the point of draft of the base-bar, which is toward the singletree coupled to the end thereof, substantially as set forth.

3. A draft-equalizer having a base-bar, a singletree coupled at one end thereof, a distributer at the opposite end, and an intermediate distributer coupled to the base-bar and having its point of attachment on that side of the point of draft of the base-bar which lies nearer the singletree, substantially as set forth.

In testimony whereof I affix my signature in presence of two witnesses.

CHARLES H. SAWYER.

Witnesses:
EMIL STAREK,
G. L. BELFRY.